(12) United States Patent
Demmer et al.

(10) Patent No.: US 11,932,094 B2
(45) Date of Patent: Mar. 19, 2024

(54) PASSENGER CAR HAVING A ROOF MODULE

(71) Applicant: Mercedes-Benz Group AG, Stuttgart (DE)

(72) Inventors: Achim Demmer, Magstadt (DE); Detlev Penczek, Rastatt (DE)

(73) Assignee: Mercedes-Benz Group AG, Stuttgart (DE)

(*) Notice: Subject to any disclaimer, the term of this patent is extended or adjusted under 35 U.S.C. 154(b) by 0 days.

(21) Appl. No.: 17/763,986

(22) PCT Filed: Jul. 24, 2020

(86) PCT No.: PCT/EP2020/070976
§ 371 (c)(1),
(2) Date: Mar. 25, 2022

(87) PCT Pub. No.: WO2021/058173
PCT Pub. Date: Apr. 1, 2021

(65) Prior Publication Data
US 2022/0305890 A1 Sep. 29, 2022

(30) Foreign Application Priority Data
Sep. 27, 2019 (DE) .................. 10 2019 006 759.2

(51) Int. Cl.
*B60J 7/043* (2006.01)
*B60J 7/02* (2006.01)

(52) U.S. Cl.
CPC .............. *B60J 7/022* (2013.01); *B60J 7/043* (2013.01)

(58) Field of Classification Search
CPC ........... B60J 7/022; B60J 7/043; B60J 7/0435
(Continued)

(56) References Cited

U.S. PATENT DOCUMENTS

| 7,077,462 B1* | 7/2006 | De Gaillard | ........... | B62D 25/06 |
| | | | | 296/210 |
| 8,747,988 B2* | 6/2014 | Brambrink | ................ | B60J 7/04 |
| | | | | 428/119 |

FOREIGN PATENT DOCUMENTS

DE 40 08 899 C1 4/1991
DE 100 15 504 A1 10/2001
(Continued)

OTHER PUBLICATIONS

PCT/EP2020/070976, International Search Report dated Nov. 3, 2020 (Two (2) pages).

*Primary Examiner* — Dennis H Pedder
(74) *Attorney, Agent, or Firm* — Crowell & Moring LLP

(57) ABSTRACT

A passenger car includes a roof with a roof opening. A roof module is disposed in the roof opening where the roof opening is delimited by transverse elements and longitudinal elements. The roof module includes a module frame that includes longitudinal frame parts spaced apart from one another in a transverse direction of the passenger car and transverse frame parts spaced apart from one another in a longitudinal direction of the passenger car where the longitudinal frame parts are connected to one another by the transverse frame parts. One of the transverse frame parts is directly connected to one of the transverse elements such that a profile component is formed which has a closed hollow cross section where the one of the transverse elements forms a lower shell of the profile component and the one of the transverse frame parts forms an upper shell of the profile component.

7 Claims, 3 Drawing Sheets

(58) Field of Classification Search
USPC .................. 296/216.01, 216.06–7, 216.09
See application file for complete search history.

(56) References Cited

FOREIGN PATENT DOCUMENTS

| | | |
|---|---|---|
| DE | 10 2004 019 995 A1 | 11/2005 |
| DE | 10 2006 053 505 A1 | 5/2008 |
| DE | 10 2016 009 136 A1 | 2/2017 |
| DE | 10 2017 220 744 B3 | 1/2019 |
| JP | 2001-328 489 A | 11/2001 |
| KR | 10-2009-0020801 A | 8/2009 |
| WO | WO 01/94141 A1 | 12/2001 |

\* cited by examiner

PASSENGER CAR HAVING A ROOF MODULE

BACKGROUND AND SUMMARY OF THE INVENTION

The invention relates to a passenger car.

A passenger car having a roof module is disclosed in DE 10 2016 009 136 A1. The roof module has a module frame which—when viewed in the installation position of the roof module in the car—comprises longitudinal frame parts spaced apart from one another in the transverse direction of the vehicle and transverse frame parts spaced apart from one another in the longitudinal direction of the vehicle which connect the longitudinal frame parts to one another. The longitudinal frame parts are first frame parts of the module frame, and the longitudinal frame parts are also referred to as first frame parts of the module frame, while the transverse frame parts are second frame parts of the module frame, and are also referred to as second frame parts of the module frame. The roof module assumes its installation position in the fully assembled state of the passenger car. The roof module also comprises at least one cover element, which is held on the module frame and is displaceable relative to the module frame and therefore relative to the body of the passenger car. The entire roof module is inserted into a roof opening of the body, in particular in the pre-installed state of the roof module. This allows the passenger car to be fitted with the roof module in a particularly time-saving and cost-effective manner.

Disclosed by the category-defining DE 10 2006 053 505 A1 is a panoramic elevating roof module, which comprises a frame having two transverse bars and two side bars, wherein the transverse bar arranged adjacent to a front window in a position inserted into a roof opening has a broader width than the rest of the frame side parts and is configured with a so-called Class A surface, which constitutes a visible surface forming a part of the body shell of the vehicle. The panoramic elevating roof module finished in this way in a pre-installation step is inserted into a roof opening of the body and is glued therein.

The object of the present invention is to provide a passenger car having such a roof module, wherein the number of parts, the cost and the weight of the roof module, and of the passenger car, can be kept particularly low.

The passenger car according to the invention comprises a vehicle roof having a roof opening delimited by transverse elements and longitudinal elements, into which a module frame is inserted. This comprises longitudinal frame parts spaced apart from one another in the transverse direction of the vehicle and transverse frame parts spaced apart from one another in the longitudinal direction of the vehicle. The roof module assumes its installation position in the fully assembled state of the passenger car. In other words, the passenger car has the body and the roof module in its fully assembled state. The longitudinal frame parts are first frame parts of the module frame, and are also referred to as first frame parts. The transverse frame parts are second frame parts of the module frame, and are also referred to as second frame parts. Particularly in relation to the installation position, the transverse frame parts extend in or at least substantially in the transverse direction of the vehicle, wherein the longitudinal frame parts extend in or at least substantially in the longitudinal direction of the vehicle. The longitudinal frame parts are connected to one another via the transverse frame parts.

The roof module also comprises a transparent or translucent cover element, for example, which is held on the module frame, in particular in a moveable manner, and is displaceable relative to the module frame and therefore relative to the body. The roof module is configured as a sliding and/or tilting sunroof, for example, such that, for example, the cover element can be displaced, i.e., can be moved, relative to the module frame and relative to the body in relation to the installation position of the roof module in the longitudinal direction of the vehicle and/or in the vertical direction of the vehicle. In particular, the roof module is configured as an external sliding sunroof. In the fully assembled state of the passenger car, the roof module is inserted into the roof opening of the body. The cover element is displaceable relative to the module frame and relative to the body between a closed position closing at least one partial region of the roof opening and at least one open position uncovering the partial region. In order to move the cover element from the closed position into the open position, for example, the cover element, in particular a rear edge of the cover element pointing rearwards in the longitudinal direction of the vehicle, is displaced upwards in the vertical direction of the vehicle, following which the cover element is moved rearwards relative to the module frame and relative to the body in the longitudinal direction of the vehicle.

In order to now be able to keep the number of parts and therefore the cost and weight of the roof module and therefore of the passenger car as a whole particularly low, provision is made for at least one of the frame parts to be integrally formed with at least one cover panel, also referred to as a cover panel element, which comprises at least one visible surface forming a part of the body shell of the passenger car. The visible surface is to be understood to be a surface which, in the fully assembled state of the passenger car, can be perceived visually and haptically by persons outside the passenger car and thus in the surroundings of the passenger car. This means that, in the fully assembled state of the passenger car, the visible surface is not outwardly covered by another component of the passenger car, for example; rather, the visible surface forms a part of the body shell and can therefore be perceived visually and haptically by the aforementioned persons.

Since the cover panel is integrally formed with the at least one frame part, the cover panel is therefore integrated into the at least one frame part. This means that the cover panel is formed by the at least one frame part, wherein the cover panel is a body shell component. As a consequence, additional separate panel elements for cladding the module frame can be omitted, or the number of such cover panels can be kept low, such that the number of parts and therefore the weight of the module frame and therefore of the roof module and of the passenger car as a whole can be kept low. Moreover, the number of joining operations for producing the roof module and the passenger car as a whole, for example, can be kept low, such that the roof module and the passenger car can be produced in a time-saving and cost effective manner.

The passenger car is characterized in that the at least one frame part is directly connected to one of the roof opening transverse elements or roof opening longitudinal elements, as a result of which this roof opening transverse element or roof opening longitudinal element and the at least one frame part form a profile component having a closed hollow cross section, wherein the roof opening transverse element or roof opening longitudinal element forms a lower shell and the at least one frame part forms an upper shell of the profile component.

It has proved to be particularly advantageous for the at least one frame part to be formed at least in part, in particular at least predominantly or entirely, from a plastic. The component therefore only has a low weight. The cover panel is formed by the plastic, for example, wherein the cover panel is a body shell component.

In a particularly advantageous embodiment of the invention, the visible surface is formed by the plastic itself, as a result of which the number of parts and therefore the cost and weight can be kept within particularly low limits.

It has proved to be particularly advantageous for the visible surface to be formed by a layer, in particular a lacquer layer, with which the plastic is coated. This is to be understood, in particular, to mean that the plastic is provided with the coating in a powdered state or particularly preferably in a liquid state of the coating. Again, in other words, provision is made, for example, within the scope of producing the roof module, for the coating to be produced from an initially powdery or preferably liquid material, which is applied in a liquid or powdered state to the plastic of the cover panel and then cures, for example, in particular such that in the fully assembled state of the roof module or passenger car the coating is solid or hard, i.e., is in a solid state of aggregation.

In order to keep the weight particularly low and to be able to implement a particularly high degree of rigidity of the module frame, provision is made in a further embodiment of the invention for the plastic to be a fiber-reinforced plastic.

In order to form the visible surface by the plastic itself and to thereby be able to implement a particularly high level of quality, in particular surface quality, of the visible surface, provision is made in a further embodiment of the invention for the plastic to be formed from a SMC material. A SMC (sheet moulding compound) or a SMC material (sheet moulding compound material) is to be understood to be an in particular plate-shaped, dough-like moulding material of at least one or a plurality of thermosetting resins and reinforcing fibers, in particular fiber glass, such that preferably the plastic is a plastic of a fiber-plastic composite. In the SMC, all necessary components are fully pre-mixed, ready for processing.

Furthermore, provision is preferably made for the plastic to be coated with the layer by means of IMC (in-mould coating) or by means of an IMC process, in particular within the scope of the method for producing the roof module. Within the scope of the IMC process, for example, the plastic is shaped by means of a mould to thereby produce the at least one frame part and therefore the cover panel. The plastic is coated with the layer while the plastic is inside the mould. The coating or the material from which the coating is produced is introduced into the mould, for example, while the mould is still free of the plastic. Then, for example, the plastic is introduced into the mould such that the plastic is coated with the layer in particular before and/or while the plastic is shaped by means of the mould, the material of which coating having been introduced into the mould before the plastic. Alternatively, it is conceivable that the plastic is first introduced into the mould while the coating or material from which the coating is produced is not yet in the mould. Once the plastic has been introduced into the mould and in particular once the plastic has been shaped by means of the mould, the coating or material thereof is introduced into the mould, for example, such that the plastic is coated with the layer while the plastic is inside the mould. This allows the at least one frame part to be produced in a particularly time-saving and cost-effective manner.

In order to be able to implement a particularly high degree of rigidity of the module frame in a particularly weight-saving manner, provision is made in a further embodiment of the invention for at least one further frame part to be formed from a metallic material, in particular from sheet metal. Thus, the module frame also referred to simply as the frame is preferably configured as a hybrid frame, the weight of which can be kept particularly low.

The passenger car according to the invention comprises in particular a self-supporting body.

The at least one cover element is held on the module frame, in particular in a moveable manner, and is displaceable, i.e., moveable, relative to the module frame and relative to the body. Preferably, the module frame is fixed to the body and is therefore unmovable relative to the body.

It has proved to be particularly advantageous for the roof opening to be delimited to the front by a transverse element of the body in the longitudinal direction of the vehicle. The transverse element is, for example, a front windscreen transverse frame, which delimits a windscreen opening of the passenger car at the top in the vertical direction of the vehicle. Inserted into the windscreen opening is a windscreen of the passenger car, for example, by means of which windscreen the windscreen opening is closed at least in part, in particular at least predominantly or entirely. The at least one frame part is directly connected to the transverse element, as a result of which the transverse element and the at least one frame part form a profile component, also referred to simply as a profile, having a closed hollow cross section. The feature that the at least one frame part is directly connected to the transverse element is to be understood, in particular, to mean that no further component of the passenger car is arranged between the at least one frame part and the transverse element. As a result, the profile and therefore the closed hollow cross section can be implemented with only a very small number of parts and therefore in a weight-saving and cost-effective manner, while at the same time a particularly high degree of rigidity of the body can be achieved. While the transverse element is a component of the body, the at least one frame part is not a component of the body; rather, it is a component of the module frame configured separately from the body. Since the hollow cross section is delimited in part by the transverse element and in part by the at least one frame part, in particular directly, and since, for example, the at least one frame part is arranged above the transverse element in the vertical direction of the vehicle, the transverse element is a lower shell and the at least one frame part is an upper shell of the profile component. Since the lower shell and the upper shell form the profile and the open hollow cross section, an additional upper shell configured on the side of the body and as a component thereof, for example, can be omitted, such that the number of parts and therefore the cost and weight can be kept particularly low. This allows a particularly large cross section to be created for the module frame in the region of the at least one frame part and of the front transverse element, such that, for example, a particularly large extension of the roof opening extending in the longitudinal direction of the vehicle can be implemented. This ensures a particularly good and extensive view through the roof opening for passengers in the interior of the passenger car.

Since the at least one frame part is preferably formed from a fiber-reinforced plastic, i.e., since the plastic is preferably a fiber-reinforced plastic, wherein preferably the at least one frame part is formed from a SMC material, a particularly high degree of rigidity can be achieved in a weight-saving manner, as compared to conventional injection moulding.

It has proved to be further advantageous for the transverse element to be formed from a metallic material, in particular a sheet metal, such that a particularly high degree of rigidity can be achieved in a weight-saving manner.

Finally, it has proved to be particularly advantageous for the visible surface to be arranged in at least one position of the cover element, in particular in the closed position of the cover element, in the longitudinal direction of the vehicle between a front edge of the cover element pointing forwards in the longitudinal direction of the vehicle and the aforementioned windscreen, in particular of an upper or rear edge of the windscreen pointing upwards in a vertical direction of the vehicle or rearwards in the longitudinal direction of the vehicle. This allows, for example, a particularly advantageous visual impression of the passenger car to be implemented, in particular in a transition region from the windscreen to the visible surface, wherein, for example, the visible surface is high-gloss black in terms of its visual perception and is therefore comparable to a black-printed glass pane of the windshield, but wherein, for example, the visible surface may be formed by the plastic itself.

Further advantages and details of the invention are set out in the following description and on the basis of the drawings.

DETAILED DESCRIPTION OF THE DRAWINGS

Figure 1:
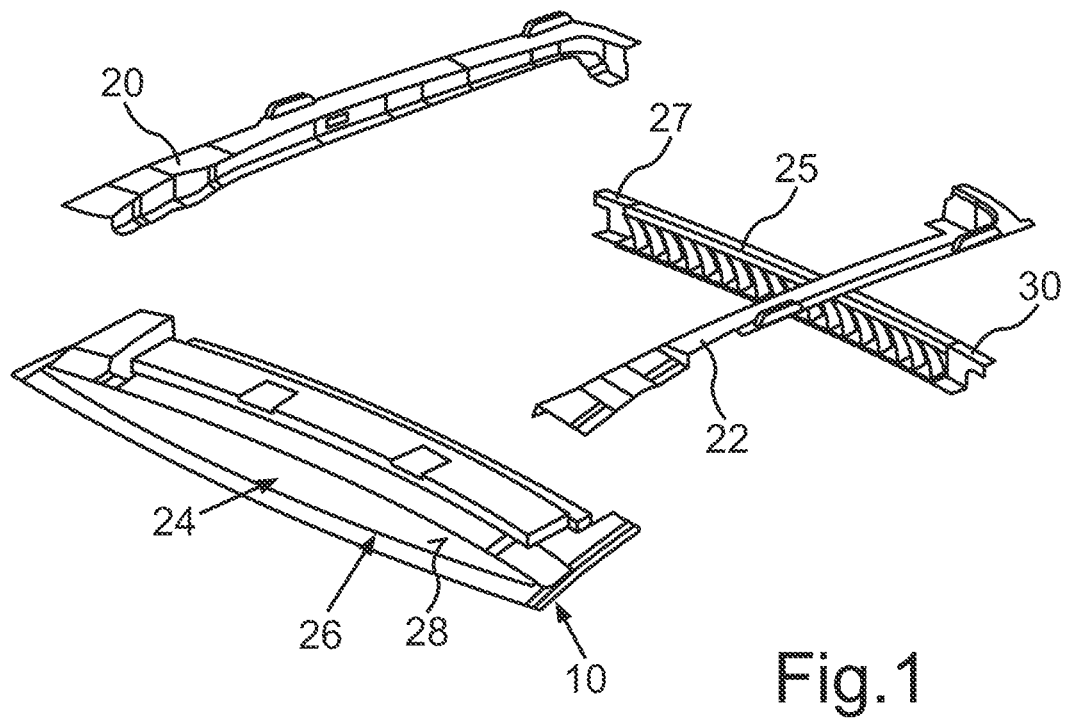
FIG. 1 shows a schematic exploded view of a module frame of a roof module according to a first embodiment for a passenger car, wherein at least one frame part of the module frame is formed from a plastic and is integrally formed with at least one cover panel comprising at least one visible surface forming a part of the body shell of the passenger car.
Figure 2:
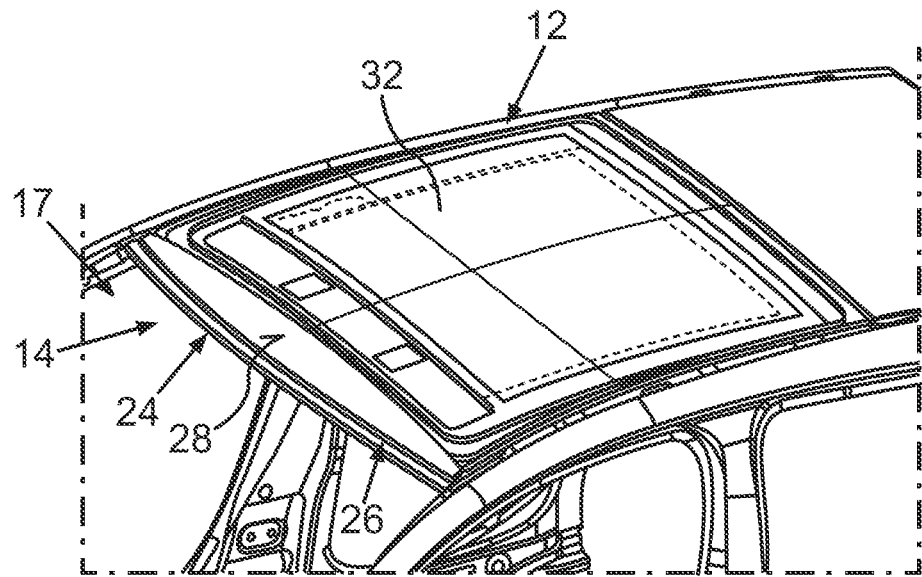
FIG. 2 shows a part of a schematic perspective view of the passenger car having the roof module according to a second embodiment.
Figure 3:
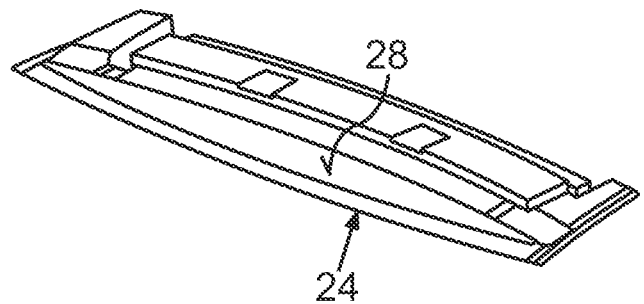
FIG. 3 shows a schematic perspective view of the at least one frame part of the roof module according to FIG. 2.
Figure 4:
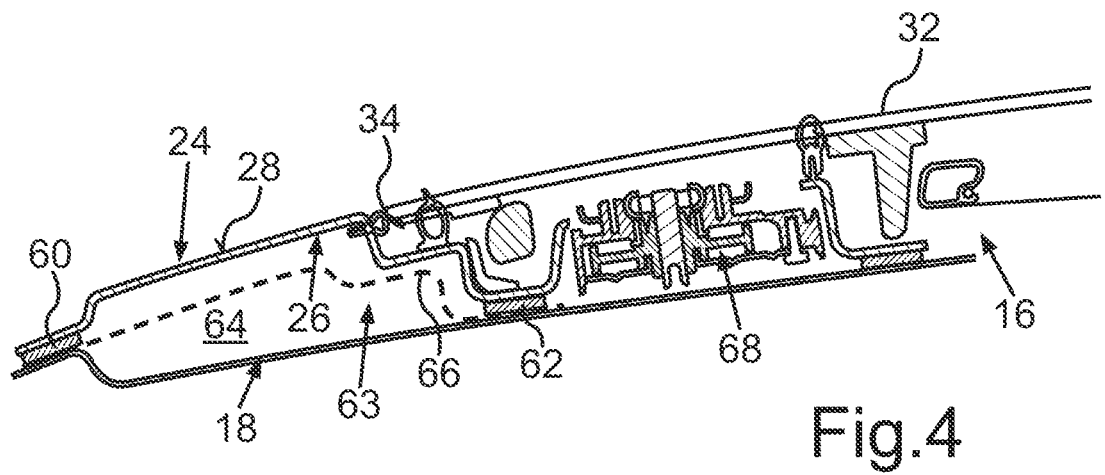
FIG. 4 shows a part of a schematic longitudinal section view through the roof module according to FIG. 2.

FIG. 1 shows in a schematic exploded view a module frame 10, also referred to simply as a frame, for a roof module of a passenger car as can be seen in FIG. 2, for example. While the module frame 10 shown in FIG. 1 belongs to a first embodiment of the roof module, FIGS. 2 to 4 illustrate a second embodiment of the roof module. The passenger car can be partially seen in FIG. 2, wherein the passenger car in FIG. 2 is shown from above in a schematic and partial perspective view. The passenger car comprises a self-supporting body 12 having a roof 14. It can be seen from FIG. 4 that the roof 14 comprises a roof opening 16, which is delimited to the front by a front transverse element 18 of the vehicle roof 14 in the longitudinal direction of the vehicle. The transverse element 18 is therefore a component of the body 12 and forms a part, namely an upper transverse supporting element, of a windscreen frame, which delimits a windscreen opening 17 of the body 12 at the top and the rear in the transverse direction of the vehicle. In the fully assembled state of the passenger car, an at least predominantly transparent windscreen, which cannot be seen in the drawings, is inserted into the windscreen opening 17, wherein the edge region of the windscreen facing the transverse element 18 or outwardly covering the transverse element 18 is black-printed, for example. The transverse element 18 of the body shell is therefore not outwardly visible to an observer.

It is clear from FIG. 1 that the module frame 10 configured separately from the self-supporting body 12 comprises longitudinal frame parts 20 and 22 spaced apart from one another in the transverse direction (y direction) of the vehicle, which longitudinal frame parts extend in or at least substantially in the longitudinal direction (x direction) of the vehicle. Moreover, the module frame 10 has transverse frame parts 24 and 25 spaced apart from one another in the longitudinal direction of the vehicle, which transverse frame parts extend in or at least substantially in the transverse direction of the vehicle. The longitudinal frame parts 20 and 22 are connected to one another via the transverse frame parts 24 and 25. For example, the longitudinal frame parts 20 and 22 are formed from a metallic material, in particular from steel and preferably from a steel sheet, wherein the longitudinal frame parts 20 and 22 are produced by deep drawing, for example, and are therefore configured as deep-drawn parts. The transverse frame part 25 is formed from a plastic, for example. The transverse frame part 25 is produced from a fiber-reinforced plastic and/or by way of injection moulding, for example. The fiber-reinforced plastic is, for example, a fiber-glass reinforced plastic comprising polyamide as the matrix and fiber glass as the reinforcing fibers, which are embedded in the matrix.

In the embodiment example shown in FIG. 1, connecting elements 27 and 30 are also provided, via which the transverse frame part 25 is connected to the longitudinal frame parts 20 and 22, for example. In this case, for example, the connecting elements 27 and 30 are at least partially extrusion-coated with the plastic from which the transverse frame part 25 is formed and thereby effectively embedded into the transverse frame part 25. The connecting elements 27 and 30 are preferably formed from a metallic material, in particular from a sheet metal and preferably from sheet steel.

In conjunction with FIG. 2, it can be seen that the roof module comprises, in its fully assembled state and in particular in the fully assembled state of the passenger car, at least one or precisely one cover element 32, also referred to simply as a cover, which can be configured so as to be transparent or translucent at least in part, in particular at least predominantly or entirely. The cover element 32 is held on the module frame in a moveable manner and is displaceable relative to the module frame 10 and relative to the body 12, in particular in the vertical direction of the vehicle and/or in the longitudinal direction of the vehicle. As is particularly clear to see from FIGS. 2 and 4, the cover element 32 is moveable relative to the module frame 10 and relative to the body 12 between a closed position shown in FIGS. 2 and 4 and at least one open position. In the closed position, the cover element 32 closes at least one partial region of the roof opening 16 into which the roof module is inserted. In the open position, the cover element 32 uncovers the partial region.

In order to now be able to keep the number of parts and therefore the weight and cost of the roof module particularly low, in the first embodiment and in the second embodiment the front transverse frame part 24 is formed from a plastic and is integrally formed with at least one cover panel 26, also referred as a cover panel element, which comprises at least one visible surface 28 forming a part of the body shell of the passenger car. In the first embodiment, the plastic from which the transverse frame part 24 and therefore the cover panel 26 are formed is a fiber-reinforced plastic, which is formed from a SMC material or is a SMC material (SMC—sheet moulding compound). The SMC material is a plate-shaped, dough-like moulding material of at least one thermosetting resin and reinforcing fibers, in particular fiber glass, wherein within the scope of the method for producing the roof module the transverse frame part 24 and therefore the cover panel 26 are produced from the SMC material. The visible surface 28 is or will be preferably formed by the plastic itself, as a consequence of which a particularly high quality surface of the visible surface 28 can be implemented. In particular, by using SMC technology the visible surface 28 can be produced in such a way that it can be formed so as to be black and high-gloss in terms of its visual and preferably also its haptic perceptibility, in such a way that the visual and preferably also the haptic perceptibility thereof is similar to or even corresponds to that or those of the black-printed edge region of the windscreen.

It can be seen from FIG. 3 that the visible surface 28 has a particularly broad width extending in the transverse direction of the vehicle and a particularly long length extending in the longitudinal direction of the vehicle and is therefore pulled far out. As is particularly clear to see from FIG. 4, in relation to the closed position of the cover element 32 in the longitudinal direction of the vehicle, the visible surface 28 is arranged between a front edge 34 of the cover element 32 and an upper edge of the windscreen, wherein the front edge 34 faces the cover panel 26 to the front in the closed position in the longitudinal direction of the vehicle and in the longitudinal direction of the vehicle adjoins the visible surface 28 or the cover panel 26 to the rear. Overall, it is clear to see that the cover panel 26 is a body shell component integrated into the front transverse frame part 24 according to the first embodiment. An additional, separate cover panel can therefore be avoided, or the number of such additional, separate cover panels can be kept low, such that the number of parts and the cost and weight of the roof module can be kept low. The visible surface 28 is also referred to as a body shell surface or body shell visible surface, since in the fully assembled state of the passenger car it can be perceived visually and haptically by persons in the surroundings of the passenger car and is therefore not covered by a different, separate panel element. The statements made above and below with respect to the transverse frame part 24 can also be applied to other frame parts and therefore, for example, to the longitudinal frame parts 20 and 22 and the transverse frame part 25, and vice versa, such that alternatively or additionally, the longitudinal frame part 20 and/or the longitudinal frame part 22 and/or the transverse frame part 25 can be formed from a plastic and can be integrally formed with at least one cover panel element comprising at least one visible surface forming a part of the body shell of the passenger car.

In a further embodiment not shown in the drawings, provision can be made for the visible surface 28 to not be formed by the plastic itself, for example, but rather by a layer configured as a lacquer layer, for example, with which the plastic is or will be coated. Provision is preferably made for the plastic to be coated with the layer by means of IMC, i.e., by means of an IMC process (IMC—in-mould coating).

Figure 5:
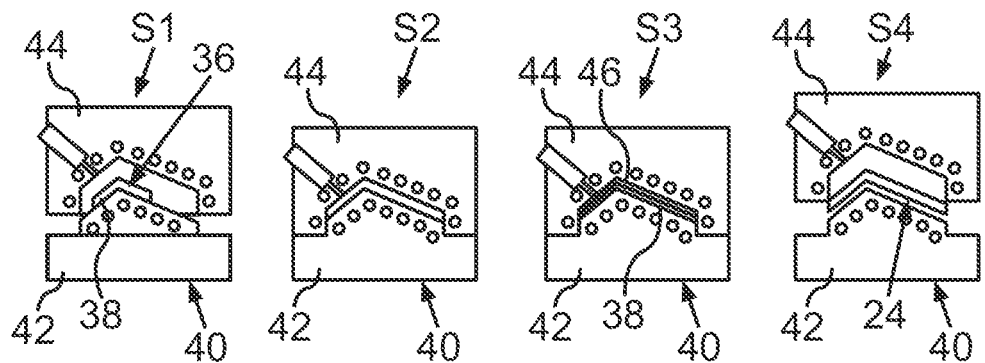
FIG. 5 shows a schematic representation of a method for producing the at least one frame part.

FIG. 5 shows, in a schematic representation, a method for producing the roof module. In particular, a method for producing the transverse frame part 24 can be seen in FIG. 5, wherein, within the scope of the method for producing the roof module, the aforementioned IMC process is used, for example, by means of which the plastic can be coated with the layer in a particularly simple, time-saving and cost-effective manner.

In a first step S1 of the method, the SMC material designated 36 in FIG. 5, for example, and therefore the plastic designated 38 in FIG. 5, for example, are introduced into a mould 40. In a second step S2 of the method, the SMC material 36 is formed by pressing together two mould halves 42 and 44 of the mould 40. This presses and shapes the plastic 38. Following the shaping of the plastic 38 and/or during the shaping of the plastic 38, a material 46, in particular in liquid or powdered state, is introduced, in particular injected, into the mould 40, such that the in particular shaped plastic 38 is coated with the material 46 at least in a partial region. The aforementioned coating is produced from the material 46, such that the plastic 38 is coated with the layer inside the mould 40. The material 46, which is initially in liquid form, for example, cures once it has been introduced into the mould 40, as a result of which the coating is ultimately produced. Thus, the coating is solid in the fully assembled state of the roof module.

In a third step S3, the material 46 is introduced into the mould 40. In a fourth step S4 temporally subsequent to the third step S3, the transverse frame part 24 is demoulded with the coating, and therefore with the cover panel 26 and the visible surface 28, by the tool halves 42 and 44 being moved away from one another. Demoulding is to be understood to mean that the transverse frame part 24 comprising the cover panel 26 and the visible surface 28 is removed from the mould 40. It is particularly clear to see from FIG. 5 that, during steps S1 and S2, the material 46 and therefore the coating had not yet been arranged in the mould 40, such that in the method the plastic 38 is introduced into the mould 40 while the coating is not yet in the mould 40. Alternatively, it is conceivable for the material 46 or the coating to first be introduced into the mould 40 while the plastic 38 is not yet in the mould 40, such that the plastic 38 is introduced into the mould 40 only after the material 46 or the coating has been introduced. In this embodiment, too, the plastic 38 is not provided with the layer outside the mould 40 but rather inside the mould 40, in particular exclusively, and is thereby coated. As a result, the transverse frame part 24 can be produced in a particularly time-saving and cost-effective manner.

Figure 6:
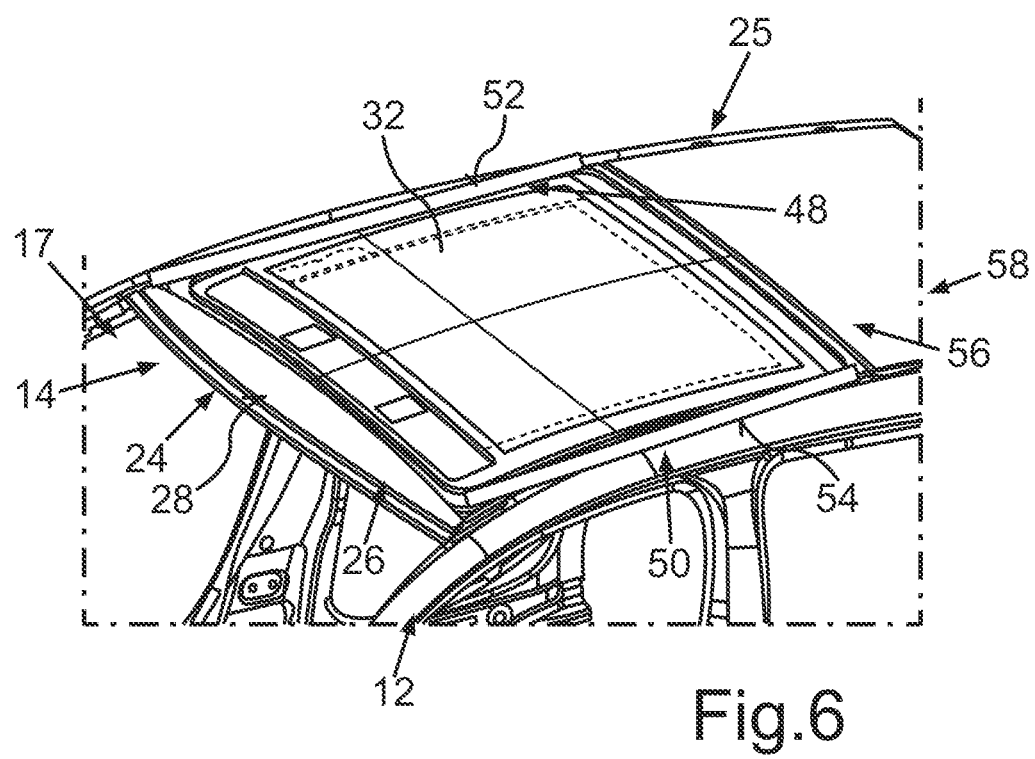
FIG. 6 shows a part of a schematic plan view of the passenger car having the roof module according to a third embodiment.

Finally, FIG. 6 shows a third embodiment of the roof module. In the third embodiment, the respective longitudinal frame part 20 or 22 is formed from a plastic and is integrally formed with a respective cover panel 48 or 50 comprising at least one visible surface 52 or 54 forming a part of the body shell of the passenger car. The cover panels 48 and 50 form a so-called rail, also referred to as a roof rail.

Alternatively or additionally thereto, provision is made in the third embodiment for the rear transverse frame part 25 to be formed from a plastic and to be integrally formed with at least one cover panel 56 comprising a visible surface 58 forming a part of the body shell of the passenger car. The cover panel 56 is used as a type of antenna cover, for example.

As can be seen from FIG. 4, provision is preferably made for the transverse element 18 to be directly connected to the front transverse frame part 24. For this, adhesive beads 60 and 62 spaced apart from one another in the longitudinal direction of the vehicle are provided, for example, via which and by means of which the transverse frame part 24 and the transverse element 18 are directly glued together. As a result, the transverse element 18 and the transverse frame part 24 form a profile component 63, also referred to simply as a profile, which extends at least substantially in the transverse direction of the vehicle and has a closed hollow cross section 64 at least in a longitudinal region. Here, the transverse frame part 24 and the transverse element 18, for example, are each shell elements which each have an open hollow cross section when considered alone. The respective open hollow cross section of the respective shell element is closed by the respective other shell element, for example, and is therefore supplemented to form the circumferentially closed hollow cross section 64. As a consequence, a shell element 66, which is illustrated in FIG. 4 by a dashed line and which belongs to the body 12 and which is therefore configured as a component of the body 12, can be omitted, for example, such that the number of parts and therefore the weight can be kept particularly low. At the same time, a high degree of rigidity can be ensured. Moreover, the transverse element 18, also referred to as the shell roof frame, is guided, extended or drawn particularly far back in the longitudinal direction of the vehicle, in order to be able to implement a particularly high degree of rigidity.

FIG. 4 also shows a part of a drive 68, also preferably configured as an electric drive, by means of which the cover element 32 can be driven and thereby displaced relative to the module frame 10. The drive 68 is a component of the roof module and can therefore be mounted onto the body 12 together with the module frame 10 and the cover element 32. In particular, the drive 68 is held at least indirectly, in particular directly, on the module frame 10.

The invention claimed is:

1. A passenger car, comprising:
   a roof, wherein the roof defines a roof opening;
   a roof module disposed in the roof opening, wherein the roof opening is delimited by transverse elements and longitudinal elements;
   wherein the roof module includes:
      a module frame comprising longitudinal frame parts spaced apart from one another in a transverse direction of the passenger car as first frame parts and transverse frame parts spaced apart from one another in a longitudinal direction of the passenger car as second frame parts, wherein the longitudinal frame parts are connected to one another by the transverse frame parts; and
      a cover element, wherein the cover element is held on the module frame and is displaceable relative to the module frame; and
      a cover panel element, wherein the cover panel element is a component of a body shell of the passenger car, wherein the cover panel element is integrated into a front one of the second frame parts of the module frame of the roof module, wherein the cover panel element has a visible surface which forms a part of the body shell of the passenger car, and wherein the visible surface is high-gloss black such that it corresponds to a black-printed edge region of a windscreen of the passenger car;
   wherein one of the transverse frame parts of the module frame of the roof module is directly connected to one of the transverse elements that delimit the roof opening of the roof of the passenger car such that a profile component is formed which has a closed hollow cross section and wherein the one of the transverse elements that delimit the roof opening of the roof of the passenger car forms a lower shell of the profile component and the one of the transverse frame parts of the module frame of the roof module forms an upper shell of the profile component.

2. The passenger car according to claim 1, wherein the visible surface is disposed in at least one position of the cover element in the longitudinal direction of the passenger car between a front edge of the cover element and a windscreen of the passenger car.

3. The passenger car according to claim 1, wherein the first and second frame parts are formed from a plastic.

4. The passenger car according to claim 1, wherein the visible surface is formed by a plastic.

5. The passenger car according to claim 1, wherein the visible surface is formed by a lacquer layer which coats a plastic.

6. The passenger car according to claim 4, wherein the plastic is a fiber-reinforced plastic.

7. The passenger car according to claim 4, wherein the plastic is formed from a sheet moulding compound (SMC) material.

* * * * *